Figure 1:
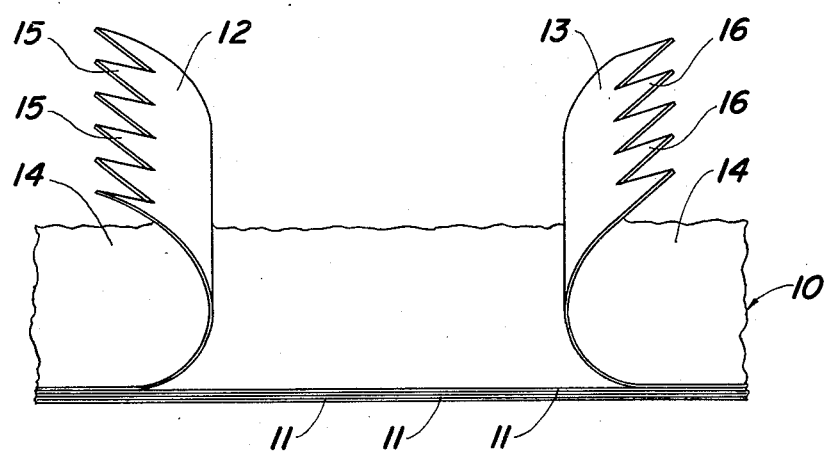

April 3, 1951  E. W. MERRILL  2,547,220
TEXTILE PRINT BLANKET

Filed May 1, 1948

INVENTOR.
Edward W. Merrill
BY
Theodore C. Browne
Attorney

Patented Apr. 3, 1951

2,547,220

UNITED STATES PATENT OFFICE 2,547,220

TEXTILE PRINT BLANKET

Edward W. Merrill, Cambridge, Mass., assignor to Dewey and Almy Chemical Company, North Cambridge, Mass., a corporation of Massachusetts Application May 1, 1948, Serial No. 24,591

2 Claims. (Cl. 154—43)

The long, large wash blankets commonly used in the textile printing industry are made by coating or spreading natural or synthetic rubber upon a strong, uniform fabric until sufficient plies are assembled to produce a blanket which possesses both sufficient strength and sufficient thickness. Subsequently, the assembly is placed in a large belting press where the rubber is vulcanized and the blanket becomes a solid, continuous mass. Textile print blankets should be endless for otherwise the joint causes a serious misprint in the goods. Accordingly, in asembling the blanket, the individual plies are butted together with the overlying ply covering the joint in the ply beneath. The joints in the individual plies are staggered about the loop of the blanket. They may be either transverse or bias cut butt joints as the operating conditions of the blanket demand. It is customary to make the joint in the top ply a transverse butt splice only, because, if a misprint occurs at this joint, the misprint would otherwise extend along a length of the goods and much material would have to be discarded because of poor printing.

The action of the textile printing process upon a textile print blanket is peculiar. Not only is there considerable pull imposed upon the blanket, but as the blanket passes under the print rollers, they exert a relatively enormous compression on the blanket. The heavy "set" of the roller causes a compressional wave to build up in the blanket which travels immediately in advance of the line of contact with the roller.

The result is that the working surface of the blanket is simultaneously compressed and elongated by the compressional wave and then retracts as the pressure is relaxed. Because of this action, the whole working area of the blanket is subject to a continuous displacing strain which makes it extremely difficult to produce a joint in the top ply which will not ultimately grin, separate, and possibly carry water from the washing apparatus.

When the splice opens and carries water, the water is squeezed back between the top ply and the first intermediate ply by the pressure of the printing rollers set against the blanket. As the loop of the blanket progresses under the rollers, the water travels in narrow paths longitudinally between the plies. This is known as a "bootleg" and renders the blanket unserviceable.

This type of failure usually occurs long before failures occur in other portions of the blanket. I visualize the action which tends to separate the plies as the loop of the blanket passes over the impression cylinder, around the various guide rolls, around the wash cylinder, and under the bank of printing rollers on the press, by comparing the bending at the joint to the action of a hinge. When the rubber which fills the space between the ends of the fabric reenforcements (the hinge butts) is worked beyond its endurance limits, the effect is the same as if the hinge pin broke and the parts gradually separated.

I am aware that it has been proposed to join belts, particularly belts which are used on sanding machines, with an interlocking form of splice which consists of alternate dovetails and dovetail sockets, the idea being to increase the tensile strength of the joint. But when such a joint was made and used in the top ply of a textile printing blanket, the blanket failed practically as soon as does a transverse butt splice.

In investigating this disappointing failure, I discovered that the tensile strength of the joint in the top ply is of relatively minor importance but that what was necessary to prevent separation was not strength in tension but rather causing the joint to enter the bite between the print and impression cylinders as nearly as possible along the axis of the blanket, not transversely. Since the ends of the dovetails extend generally transversely of the blanket, they opened about as easily as does a transverse butt splice.

To secure this approximate axial entrance, I form the joint in the plies in the shape of long, narrow, interfitted V's. Assuming that the blanket is 40" wide, I find that at least a 30% improvement in life is secured if the base of the triangle forming the V's is approximately ½ an inch long and the altitude is from 2 to 4 times the length of the base. Obviously, increasing the ratio of altitude to base more nearly approaches an axial entrance of the joint into the bite, but cost and manufacturing difficulty interpose a practical limit. It is difficult to interfit a long, rat-tail shape properly.

Figure 2:
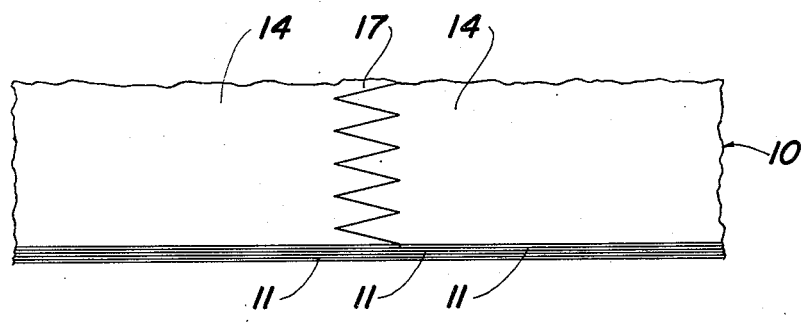

In the drawings, Figure 1 is a perspective view showing the base plies after assembly and rolling but showing an exploded view of the joint in the top ply;

Figure 2 is a top plan view of a portion of the blanket with the line of the joint shown at —17—. Actually, after pressing and curing the joint between plattens, the line —17— is practically invisible.

The blankets —10— are assembled by building up circumferentially coextensive plies of rubber-coated fabric (shown at —11—, —11— of Figure 1), staggering the joints in the plies along the loop of the blanket, and rolling each ply into firm adhesive contact with the ply beneath. A striking plate is then laid over the assembled bottom plies —11—, —11—, and the two ends —12— and —13— of the upper ply —14— are lapped on top of the plate. A multiple V-shaped cutting die is driven through both ends at the lap. Thus the accurate interfit of the cut V's shown at —15—, —15— and —16—, —16—, Figure 1 is assured. Subsequently the joint is pounded and a thin strip of gum stock is laid along the joint. The blanket is then press-cured.

Blankets having only the top ply spliced as described have already run nine million yards and are still in service. This contrasts with the four to six million yard life of blankets made without my improvement. Better blankets are made when the joint construction just described is used at all joints and in all plies.

This is the preferred construction, but my invention includes the incorporation of such a joint at least in the top ply and in as many others as may be desired. And, although the splice is particularly valuable in textile print blankets, it is obvious that it is useful in print blankets generally, whether used in textile or other forms of web or sheet printing.

The word "rubber" is used in the specification and claims in its present-day generic sense to include not only natural rubber, but the other elastomeric polymers now used as its mechanical substitutes.

I claim:
1. An endless print blanket composed of a multiplicity of rubber-coated circumferentially coextensive textile fabric plies, having the fabric at least of its top ply butted along a line of interfitted V's having bases which are but small fractions of the width of the blanket, the length of said V's being at least a small number multiple of the base dimension, said blanket being vulcanized into a unitary structure.

2. An endless textile print blanket comprising a plurality of plies of circumferentially coextensive rubber-coated textile fabric vulcanized to a unitary mass and having the ends of the top working surface ply butted along a line of interfitted V's extending transversely across the blanket, the base of each V being about ½ of an inch long and the altitude of each V being more than one inch in extent.

EDWARD W. MERRILL.

REFERENCES CITED

The following references are of record in the file of this patent:

UNITED STATES PATENTS

| Number | Name | Date |
|---|---|---|
| 2,027,747 | Morton | Jan. 14, 1936 |
| 2,110,183 | Tubbs | Mar. 8, 1938 |
| 2,300,728 | Goss | Nov. 3, 1942 |
| 2,336,084 | Freedlander | Dec. 7, 1943 |
| 2,391,731 | Miller et al. | Dec. 25, 1945 |